United States Patent

Tseng et al.

Patent Number: 5,335,920
Date of Patent: Aug. 9, 1994

[54] BRUSH SEAL

[75] Inventors: Wu-Yang Tseng, West Chester; Brent L. Bristol, Milford; Rolf R. Hetico, Cincinnati; Christopher C. Glynn, Hamilton, all of Ohio

[73] Assignee: General Electric Company, Cincinnati, Ohio

[21] Appl. No.: 932,514

[22] Filed: Aug. 20, 1992

[51] Int. Cl.5 ............................................. F16J 15/447
[52] U.S. Cl. ........................................... 277/1; 277/53; 415/174.5
[58] Field of Search ............... 277/53, 55, 56, 216, 277/192, 1; 415/230, 174.5

[56] References Cited

U.S. PATENT DOCUMENTS

| Re. 30,206 | 2/1980 | Ferguson et al. |
|---|---|---|
| Re. 30,600 | 5/1981 | Long et al. |
| 885,032 | 4/1908 | De Ferranti |
| 2,878,048 | 3/1959 | Peterson |
| 3,917,150 | 11/1975 | Ferguson et al. |
| 4,202,554 | 5/1980 | Snell |
| 4,204,629 | 5/1980 | Bridges |
| 4,218,189 | 8/1980 | Pask |
| 4,265,455 | 5/1981 | Lundgren |
| 4,269,420 | 5/1981 | Persson |
| 4,358,120 | 11/1982 | Moore |
| 4,411,594 | 10/1983 | Pellow et al. |
| 4,415,309 | 11/1983 | Atterbury |
| 4,595,207 | 6/1986 | Popp |
| 4,600,202 | 7/1986 | Schaeffler et al. |
| 4,645,362 | 2/1987 | Orte |
| 4,678,113 | 7/1987 | Bridges et al. |
| 4,696,480 | 9/1987 | Jornhagen |
| 4,755,103 | 7/1988 | Streifinger |
| 4,756,536 | 7/1988 | Belcher |
| 4,781,388 | 11/1988 | Wohrl et al. |
| 4,809,990 | 3/1989 | Merz |
| 4,971,336 | 11/1990 | Ferguson |
| 5,026,252 | 6/1991 | Hoffelner |
| 5,029,875 | 7/1991 | Spain et al. |
| 5,031,922 | 7/1991 | Heydrich |
| 5,106,104 | 4/1992 | Alkinson et al. ............ 415/174.5 |
| 5,192,084 | 3/1993 | Norbury ................... 277/53 |
| 5,201,530 | 4/1993 | Kelch et al. ............. 277/55 |

FOREIGN PATENT DOCUMENTS

| 9214951 | 9/1992 | PCT Int'l Appl. ............ 277/53 |
|---|---|---|
| 2250789A | 6/1992 | United Kingdom . |
| 2250790A | 6/1992 | United Kingdom . |

*Primary Examiner*—William A. Cuchlinski, Jr.
*Assistant Examiner*—DePumpo Daniel G.
*Attorney, Agent, or Firm*—Jerome C. Squillaro; Nathan D. Herkamp

[57] ABSTRACT

A brush seal is provided having a plurality of bristle layers sandwiched between a pair of circumferential plates with the upstream layers of bristles having a higher first fundamental vibration frequency than downstream seal layers. Such a seal has bristles in the upstream layer or layers that have a greater cross sectional area, a lesser lay angle, are shorter, or some combination of the foregoing.

16 Claims, 3 Drawing Sheets

BRUSH SEAL

The present invention relates in general to a sealing element and in particular to a brush seal that is interposed in the leakage path between rotating and stationary members of a gas turbine engine and that is less subject to bristle chamfering.

BACKGROUND OF THE INVENTION

A turbofan gas turbine engine operates according to well known principles wherein an incoming air stream flows through the engine along an annularly configured, axially extending flow path. A portion of the incoming air stream is compressed in a compressor section of the engine and then mixed with fuel and burned in a combustor section to produce a high energy, high temperature exhaust gas stream. The gas stream exits the combustor and subsequently passes through a turbine section that extracts energy from the exhaust gas stream to power the compressor and produce bypass thrust by rotating a fan that acts generally on the remaining portion of the incoming air stream.

Uncontrolled leakages of gases within the engine contributes to a reduced engine efficiency. Seals are used to control this energy loss by interposing them in a leakage path to reduce the volume or mass of the gas—atmospheric air, exhaust, or otherwise—passing from one part of the engine to the other. In the past engine seals have principally taken the form of labyrinth seals. The use of brush seals as a substitute for labyrinth seals is presently being investigated.

A typical brush seal includes a plurality of seal stages with each stage including a bristle pack having a plurality of bristles of a substantially uniform cross sectional area. The bristle pack is disposed between a pair of annularly configured plates. Usually the bristles are disposed at about a forty five degree angle to a radius drawn from the engine center line. A brush seal is usually attached along its outer circumferential edge to a stationary portion of the engine with the inward, free ends of the bristles disposed in a sealing engagement with a sealing surface on a rotating engine part. Brush seals are not intended to function so as to completely seal one engine part from another, but rather rely upon the torturous flow path created between the bristles to reduce the airflow from one part of the engine to another and to control the pressure drop between the engine parts.

The bristles in the bristle pact are somewhat flexible; thus, they are able to bend during an engine transient and still retain their sealing ability after the transient has passed. Examples of such transients include differential thermal growth between the engine parts, rotor/stator relative movement, and vibration of some sort. Thus, a rotating engine shaft, for example, may enter a vibration mode where the shaft is vibrating about its longitudinal axis, that is, when the shaft is rotating eccentrically.

The sealing efficiency of a brush seal over time is affected by the wear on the bristle ends contacting the sealing surface on the opposing engine part, as well as the overall contact of the bristle ends with the sealing surface. Worn bristles ends will dictate replacement of the seal or particular seal stage earlier than otherwise would be necessary, thereby increasing engine operating costs. Eccentric rotation of a rotor shaft can create such unwanted bristle wear.

Eccentric shaft rotation has been found to induce a one per revolution unsteady flow with respect to the stationary bristles. This unsteady flow is the result of a "blow-by" situation being created by the eccentric shaft rotation, which causes a gap to open between the bristle ends and the rotating engine part. The unsteady flow causes the bristles to vibrate as a cantilever beams with the free ends of the bristles deflecting radially, tangentially, and axially. Radial deflection of the free ends inwardly increases the rubbing force between the free ends of the bristles and the sealing surface, thereby causing the free ends to wear. Because the amplitude of the vibration decreases axially from the inlet or upstream side of the seal to the outlet or downstream side of the seal, the upstream bristle free ends experience wear to a greater extent than the downstream free ends. Thus the bristles are chamfered by the one per revolution induced vibration.

It would be desirable to increase the lifetime and sealing efficiency of brush seals by reducing chamfering of the bristle pack caused by one per revolution induced vibrations during eccentric rotation of a rotor shaft.

SUMMARY OF THE PRESENT INVENTION

There is provided by the present invention apparatus including a brush seal that is less subject to chamfering. In each of the embodiments of the present invention to be described herein the brush seal includes at least one stage that includes a bristle pack and an upstream and a downstream plate sandwiching the bristle pack, with the bristle pack having upstream and downstream sides and having a plurality of bristles. A seal according to the present invention has a layer of upstream bristles each of which have a first fundamental vibration frequency that is higher than that of downstream seal bristles such that the upstream bristles are more difficult to excite by one per revolution unsteady gas flow created by eccentric shaft rotation. In one embodiment of the present invention the bristle pack, which is defined by an axial length, includes bristles having a greater cross sectional area disposed at the upstream side of the bristle pack than those disposed downstream. In another embodiment of the present invention, the upstream bristles may have a shorter length than the downstream bristles and may have a lay angle less than those of the downstream bristles in the bristle pack. In still another embodiment, an inlet flow guide attached to the front plate of the most upstream seal stage may be utilized. The flow guide includes a guide plate attached to the upstream seal plate and a flange extending upstream therefrom.

The foregoing invention and its advantages over the prior art will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
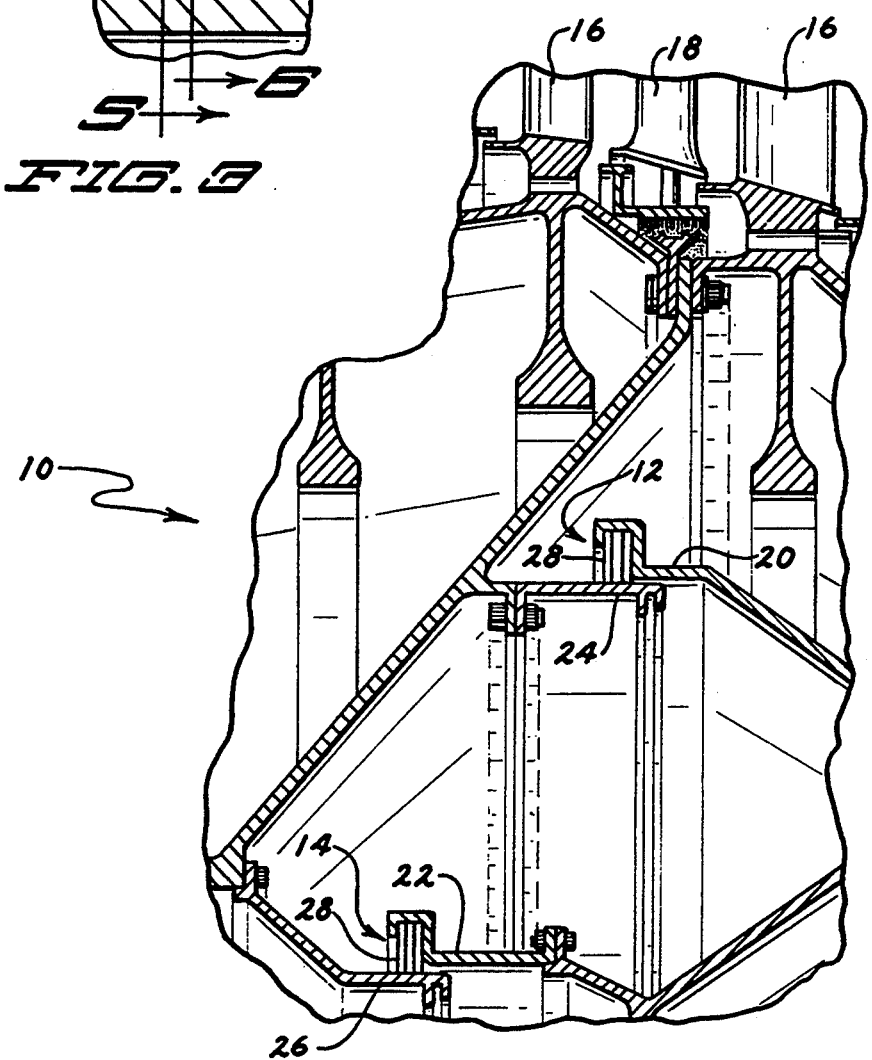
FIG. 1 shows a gas turbine engine in a partial cross sectional, side elevation view and indicates a potential application use of the present invention as herein described.

The present invention is described and shown in the accompanying FIGS. 3–7 relative to its application in an aircraft gas turbine engine 10 shown in a partial cross sectional, side elevation view in FIG. 1. A pair of brush seals 12 and 14 are shown in place in a portion of a turbine section of gas turbine engine 10. As is well known, a turbine section includes a plurality of circumferential rows of substantially radially directed rotor blades 16 interdigitated with one or more circumferential rows of substantially radially extending stator vanes 18. Brush seals 12 and 14 are interposed between stationary engine structural members 20, 22 and rotating members 24, 26, respectively. As generally indicated, seals 12 and 14 each include a plurality of bristles 28 that extend from a fixed connection at one end to stationary member 20 and 22 to a sealing engagement with the rotating members 24 and 26. The configuration of brush seals 24 and 26 will be explained in greater detail with reference to FIG. 2.

Figure 2:
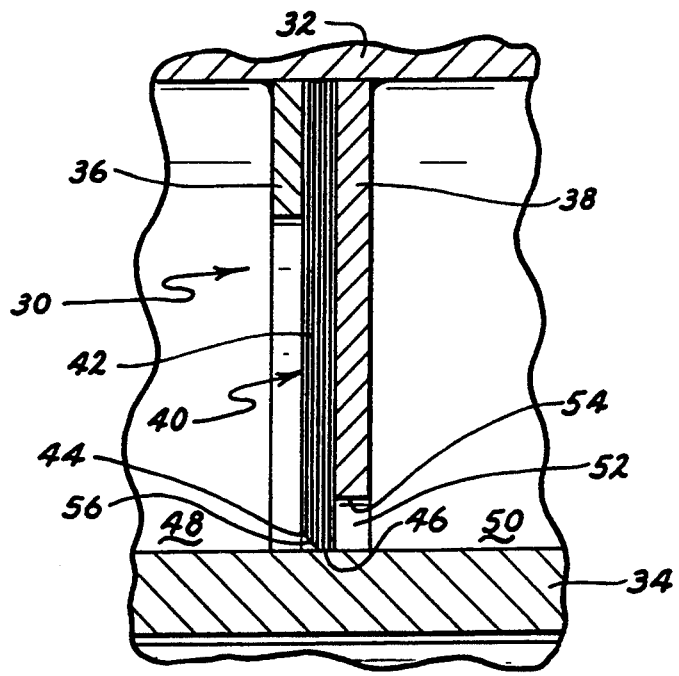
FIG. 2 shows in enlarged detail a prior art seal having a chamfered bristle pack due to one per revolution induced vibration.

FIG. 2 illustrates a prior art application of a brush seal 30. Brush seal 30 is interposed between a stationary member 32 and a rotating member 34. Seal 30 typically comprises a plurality of substantially identical seal stages, although only one such stage is shown here for purposes of illustration. It will be understood that each stage in a multiple stage brush seal will typically be substantially identical to all other stages in the seal. Each stage includes an annularly configured front or upstream plate 36 and an annularly configured rear or downstream plate 38 sandwiching a bristle pack 40 that includes a plurality of bristles 42, respectively. Bristles 42 each have a free end or bristle tip 44 that sealing engages a sealing surface 46 of rotating member 34. Brush seal 30 is interposed between an upstream portion 48 and a downstream portion 50 of a leakage path 52 existing between members 32 and 34. Brush seal 30 is disposed in leakage path 52 to control the flow of gas through the seal. This gas flow may be an atmospheric air stream, the exhaust gas stream exiting the compressor, or a combination of the two streams, and it will be understood that "gas" as used hereafter refers to both or to any gaseous phase of matter. It will also be understood that leakage path 52 is partially defined by the clearance gap between rotating member 34 and the inner surface 54 of downstream plate 38.

FIG. 2 further illustrates the form of bristle wear known as chamfering that can occur as a result of eccentric rotation of the rotating member 34. The aforementioned deflections of the bristle tips caused by the eccentric rotation will create an irregular wear pattern on the free ends of the bristles themselves. Thus, the bristles at the forward or upstream portion of the bristle pack will experience a greater wear than those downstream. The upstream or seal inlet side bristles tips 44 have experienced a radially outward wear to a greater extent than those bristle tips farther downstream. This has resulted in the creation of the chamfer of the bristle pack as shown. This irregular wear pattern itself will contribute to the loss of sealing efficiency since it will take less turbulent air to cause the aforementioned bristle deflections to occur, and create a greater likelihood of seal blow-by.

FIGS. 3–7 represent various embodiments of the present invention wherein an improved seal includes means for reducing one per revolution induced bristle vibration that causes chamfering of the bristle pack. This can be accomplished by increasing the first fundamental vibration frequency for the front bristle layers of a brush seal relative to the downstream layers so that they will not be excited at the same time as the downstream layers. Excitation of a higher frequency bristle such that the free ends of the bristles deflecting radially, tangentially, and axially is more difficult, thereby reducing the potential for bristle chamfering.

Thus, referring now to FIGS. 3 and 4, an embodiment of the present invention will now be described. Thus, a single stage seal 100 includes an upstream plate 102 and a downstream plate 104 sandwiching therebetween a bristle pack 106. Seal 100 is disposed between members 108 and 110. Where seal 100 is disposed in a gas turbine engine such as engine 10, member 108 would be stationary and member 110 would generally be a rotating member. Furthermore, as is well known, in such an application, plates 102 and 104 will generally have an annular configuration as will bristle pack 106. Seal 100 is disposed within the leakage path between members 108 and 110. The leakage path is defined generally by the inwardly directed surface 112 of member 108 and the outwardly directed surface 114 of member 110.

Bristle pack 106 includes an upstream side 116 and a downstream side 118. As shown in the Figures, bristle pack 106 includes a plurality of bristles 120 arranged in multiple layers 122–132 as best seen in FIG. 4. Bristle pack 106 has an axial width generally equal to the space between upstream and downstream plates 102 and 104. Each bristle 120 is defined in part by a longitudinal length and by its cross sectional area taken substantially transverse to its length. In the embodiment of the present invention as represented by seal 100, at least one upstream layer, and as shown in FIG. 4 a plurality of upstream layers 122 and 124, is composed of bristles having a greater cross sectional area than the down stream layers 126–132. The thicker upstream bristles are more resistant to being excited by the one per revolution unsteady flow established by the eccentric rotor rotation. As such, they are less likely to flex radially inwardly in a vibration mode that causes the bristle tips to become chamfered as indicated in FIG. 2. It will be understood that although six such bristle layers are represented in FIG. 4, the present invention is applicable to brush seals having more or less layers and to a brush seal having more or fewer than two rows of thickened upstream bristles. It will further be understood that upstream and downstream refer to the direction of air flow through the seal as generally indicated by arrow 134. When the front layers of bristles, such as layers 122 and 124, are made thicker as shown in FIG. 4, they may also be made shorter as shown to prevent them from causing damage to the sealing surface, commonly called a rub coat, on the rotating part. In other words, the bristles may have a shorter radial projection. The gap shown in the Figure is for purposes of illustration only and the bristles should be sized according to the particular use and expected operating transients of the rotating member 110. Because the bristles are made stiffer, they are more likely to cause additional wear on the rotating engine member, such as member 110, when the bristle ends contact the member. This additional wear can also lead to additional leakage and reduced sealing efficiency.

Figure 3:
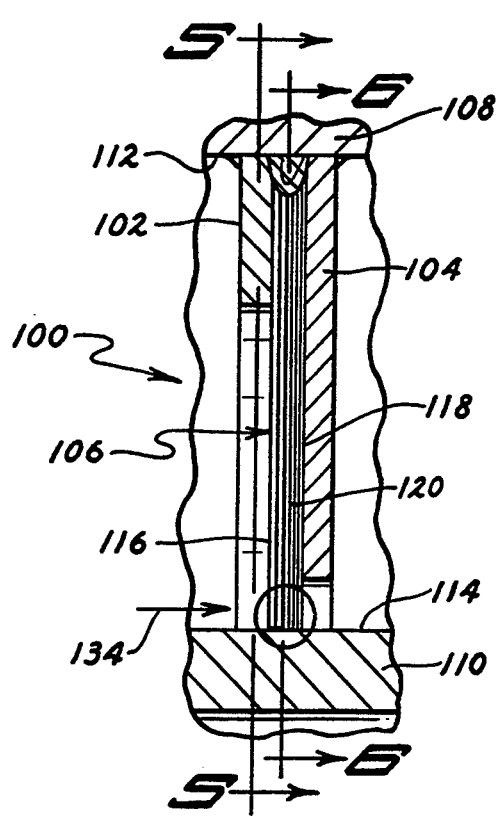
FIG. 3 shows in a side elevation cross sectional view an embodiment of the present invention wherein the brush seal includes bristles having a greater cross sectional area disposed in the upstream layers of the bristle pack.
Figure 4:
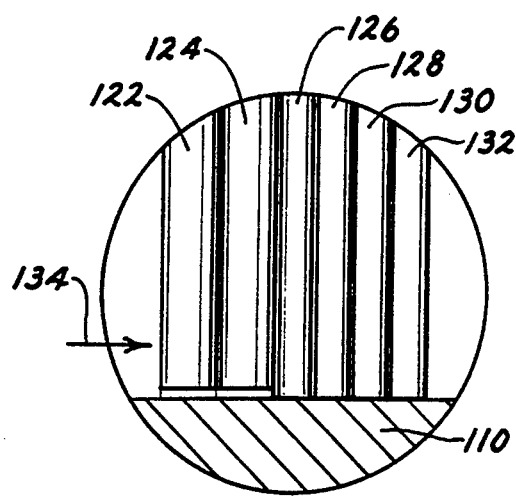
FIG. 4 shows an enlarged view of the bristles shown in FIG. 3.
Figure 5:
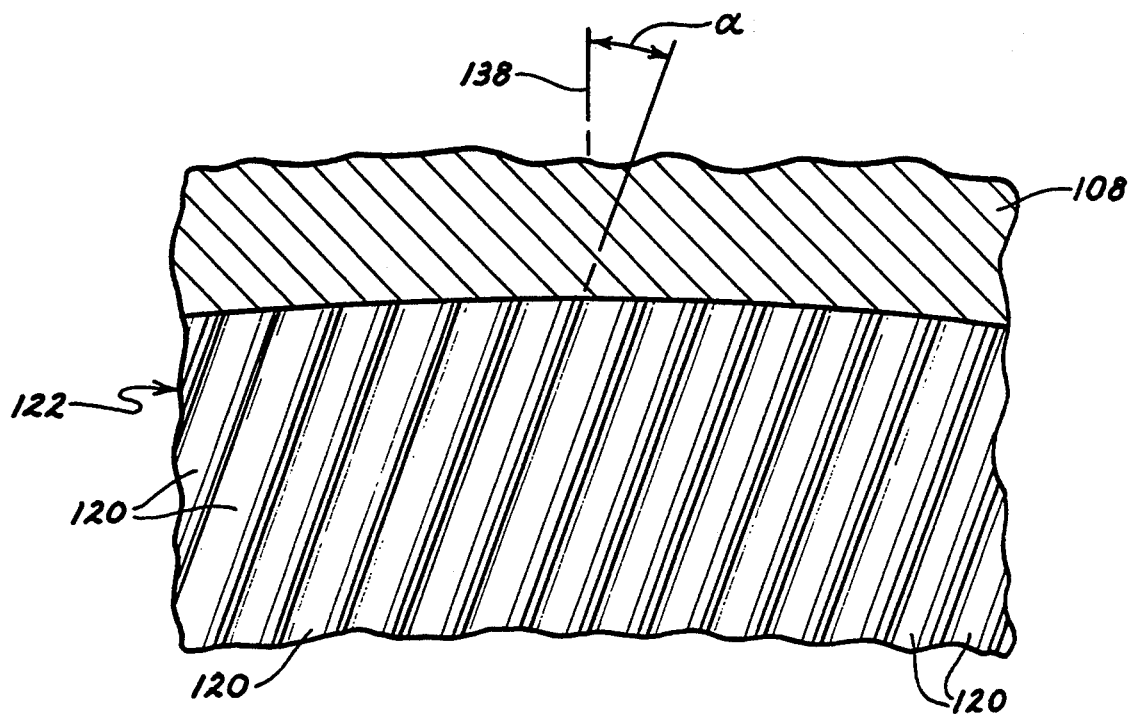
FIG. 5 illustrates in a partial cross sectional view the embodiment shown in FIG. 3 taken along cutting plane 5—5 thereof.
Figure 6:
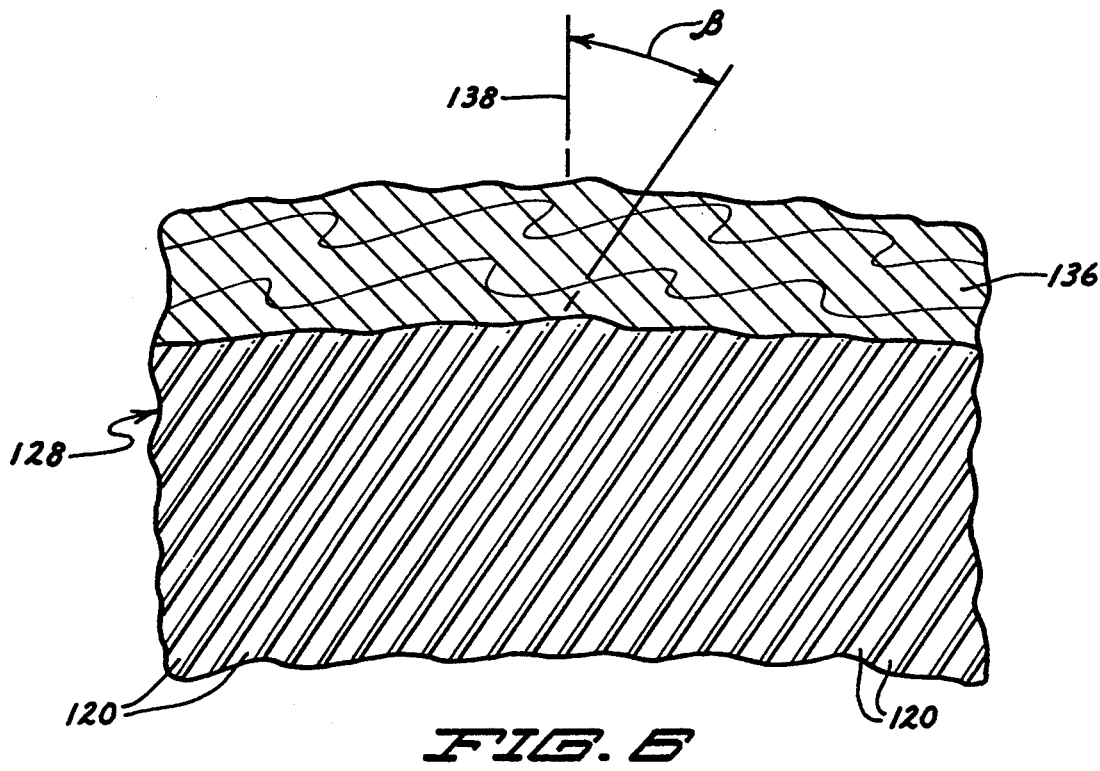
FIG. 6 illustrates in a cross sectional view the embodiment shown in FIG. 3 taken along cutting plane 6—6 thereof and together with FIG. 5 illustrates the disposition of the upstream and downstream bristles of the seal bristle pack at different lay angles.

FIGS. 5 and 6 represent another embodiment of the present invention which can be coined if desired with the embodiment shown in FIGS. 3 and 4. Thus, FIGS. 5 and 6 represent cross sections taken through FIG. 3 looking in the downstream direction. As indicated in FIG. 5, each bristle 120 is attached by known means such as a weld bead 136 so as to lie at an angle with respect to a radius 138 of the axis of rotation of rotating member 110. FIG. 5 shows the upstream layer 122 of bristles 120 disposed at a first angle $\alpha$ with respect to radius 138. FIG. 6 which is a downstream cross section taken through seal 100 and through downstream bristle layers 128, for example, shows the bristles 120 of layer 128 disposed at a second angle $\beta$ with respect to radius 138. In the FIGS. 5 and 6, the angle $\alpha$ at which the bristles of layer 122 are disposed is less than the angle $\beta$ at which the bristles 120 of layer 128 are disposed. By reducing the angle at which the bristles in layer 122 are disposed so that the bristles are more radially directed, the bristles are stiffened with respect to the downstream bristles and are therefore less subject to being excited by the one per revolution unsteady flow induced by the eccentric rotor rotation.

As previously stated, the amplitude of the bristle excitation decreases from the upstream to the downstream side of the brush seal. As a result, only the bristles 120 of the upstream layers, such as layers 122 and 124 should be thickened with respect to the downstream bristles or disposed at a lesser angle with respect to a radius of the axis of rotation.

FIGS. 3–6 therefore represent several combinations for easing the chamfering of the bristles of a brush seal. Among them are that the bristles could all have the same radial cross section, but the upstream bristle layers would be disposed at a different angle and be shorter in radial projection. Another combination is that the upstream bristles could have a larger cross sectional area than downstream bristle layers, could be disposed at the same angle, but be shorter in radial projection. Still another combination is that the upstream bristles could have the same cross section and the same radial projection as downstream bristles, but be disposed at a different angle. Another combination is that the upstream layers could have a larger cross section, a shorter length, and be disposed at a smaller angle. Each of these combinations results in an upstream bristle layer that has a higher natural frequency than the downstream layers and that is more difficult to excite by eccentric shaft rotation.

Figure 7:
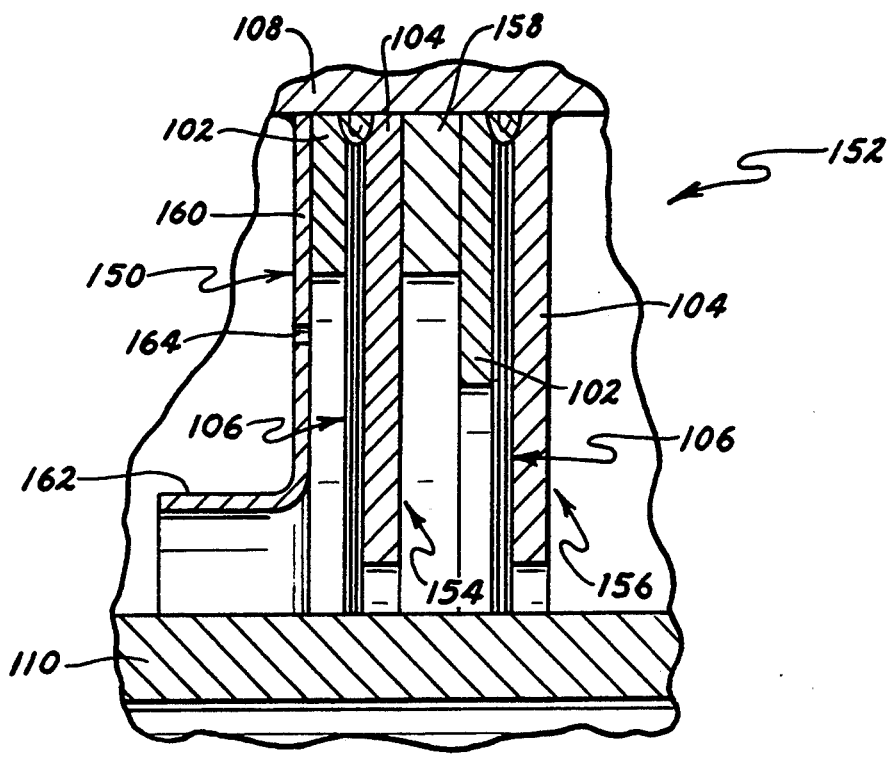
FIG. 7 illustrates another embodiment of the present invention wherein a inlet flow guide is utilized to straighten the air flow entering the seal.

FIG. 7 represents another embodiment of the present invention wherein an inlet flow guide 150 is disposed upstream of a multiple stage seal 152. Seal 152 as shown, comprises first upstream seal stage 154 and second downstream seal stage 156, each comprising similar elements as the seal 100 illustrated in FIG. 3. Seal stages 154 and 156 are separated by a spacer 158 which may be omitted if desired. Inlet flow guide has a substantially annular configuration defined by an annular plate member 160. Flow guide 150 further includes a flange 162 that extends upstream from the radially inner edge of annular plate member 160. Inlet flow guide 150 may further include a plurality of air metering holes 164, one of which is shown in FIG. 7. Flange 162 acts to diminish the unsteady flow of air through the seal caused by the eccentric rotation of the rotating member 110. This in turn reduces the forces on the bristles of the bristle pack 106 that induces the radial deflections of the bristle tips into the more aggressive engagement with the sealing surface of rotating member 110, which in turn as previously noted acts to chamfer the leading edge or upstream side of the bristle pack 106.

As shown in the Figures, a brush seal may comprise one or more seal stages. The present invention is equally useful on each stage of a brush seal, whether a single stage or multiple stage seal. Furthermore, the embodiment shown and described herein may be used in various combinations as needed to reduce the chamfering of the bristle pack caused by the eccentric rotation of the rotor.

Thus the present invention provides an improved brush seal that is subject to less irregular bristle wear and results in greater engine efficiency. Each embodiment of the improved brush seal shown and described herein reduces the chamfering of the bristle pack associated with the eccentric rotation of the rotating member. The present invention when utilized in a gas turbine engine will result in a brush seal having a greater lifetime due to a reduction in irregular bristle wear as well as a more efficient seal, which will increase overall engine efficiency and reduce operating costs.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. Sealing apparatus for sealing a leakage path extending from an upstream high pressure region to a downstream low pressure region between a rotating and a stationary member of a fluid flow machine, said apparatus comprising:

a brush seal having at least one stage, said stage including upstream and downstream plates, a bristle pack sandwiched between said upstream and downstream plates, said bristle pack defined in part by an axial width defining an axial direction, said axial direction being substantially parallel to the direction of the leakage path, said bristle pack further including a plurality of bristles disposed in multiple layers in said axial direction, each of said bristles being defined by a longitudinal length and a cross sectional area taken substantially transversely to said longitudinal length, the bristles of at least one upstream layer of said bristle pack having a greater cross sectional area than those in downstream layers.

2. The apparatus of claim 1 wherein the bristles of said at least one upstream bristle layer are disposed at a lay angle less than that of downstream bristle layers, wherein the rotation of said rotating member defines a radial direction relative thereto, wherein each bristle of said bristle pack has a longitudinal axis defined by its longitudinal length, and wherein the lay angle of a bristle in a bristle layer is defined by its angular relationship to said radial direction.

3. The apparatus of claim 2 wherein the bristles of said at least one upstream bristle layer are shorter than those bristle in downstream bristle layers.

4. The apparatus of claim 1 wherein the bristles of said at least one upstream bristle layer are shorter than those bristles in downstream bristle layers.

5. The apparatus of claim 1 wherein said means comprises an inlet flow guide attached to said upstream plate, said guide including a guide plate and a flange extending upstream from said guide plate.

6. Sealing apparatus for sealing a leakage path extending from an upstream high pressure region to a downstream low pressure region between rotating and stationary members of a fluid flow machine, said apparatus comprising:

a brush seal having at least one stage, said stage including a bristle pack sandwiched between upstream and downstream plates, said bristle pack defined in part by an axial width defining an axial direction, said axial direction being substantially parallel to the direction of the leakage path, said bristle pack further including a plurality of bristles disposed in multiple layers in said axial direction, each of said bristles being defined by a longitudinal length and a cross sectional area taken substantially transversely to said longitudinal length, the bristles of at least one layer of said bristle pack being disposed at a lay angle less than that of downstream bristle layers, wherein the rotation of said rotating member defines a radial direction relative thereto, wherein each bristle of said bristle pack has a longitudinal axis defined by its longitudinal length, and wherein the lay angle of a bristle in a bristle layer is defined by its angular relationship to said radial direction.

7. The apparatus of claim 6 wherein the bristles of said at least one upstream bristle layer are shorter than those bristles in downstream bristle layers.

8. The apparatus of claim 7 wherein said means further comprises an inlet flow guide attached to said upstream plate, said guide including a guide plate and a flange extending upstream from said guide plate.

9. A brush seal for sealing a leakage path extending from an upstream high pressure region to a downstream low pressure region between rotating and stationary members of a fluid flow machine, said brush seal having at least one stage, said stage including a bristle pack and an upstream and a downstream plate sandwiching said bristle pack, said bristle pack having upstream and downstream sides and having a plurality of bristles, said seal further including means for reducing one per revolution induced excitation of said bristles in said bristle pack substantially caused by eccentric rotation of the rotating member, wherein said means for reducing one per revolution induced excitation reduces chamfering of said upstream side of said bristle pack, and wherein said means comprises the bristles of at least one layer of said bristle pack having a greater cross sectional area than those in downstream layers.

10. The apparatus of claim 9 wherein the bristles of said at least one upstream bristle layer are disposed at a lay angle less than that of downstream bristle layers, wherein the rotation of said rotating member defines a radial direction relative thereto, wherein each bristle of said bristle pack has a longitudinal axis defined by its longitudinal length, and wherein the lay angle of a bristle in a bristle layer is defined by its angular relationship to said radial direction.

11. The brush seal of claim 10 wherein the bristles of said at least one upstream bristle layers are shorter than those bristles in downstream bristle layers.

12. The brush seal of claim 9 wherein said means comprises an inlet flow guide attached to said upstream plate, said guide including a guide plate and a flange extending upstream from said guide plate.

13. A brush seal for sealing a leakage path extending from an upstream high pressure region to a downstream low pressure region between rotating and stationary members of a fluid flow machine, said brush seal having at least one stage, said stage including a bristle pack and an upstream and a downstream plate sandwiching said bristle pack, said bristle pack having upstream and downstream sides and having a plurality of bristles, said seal further including means for reducing one per revolution induced excitation of said bristles in said bristle pack substantially caused by eccentric rotation of the rotating member, wherein said means for reducing reduces chamfering of said upstream side of said bristle pack, and wherein said means comprises the bristles of at least one layer of said bristle pack being disposed at a lay angle less than that of downstream bristle layers, wherein the rotation of said rotating member defines a radial direction relative thereto, wherein each bristle of said bristle pack has a longitudinal axis defined by its longitudinal length, and wherein the lay angle of a bristle layer in a bristle layer is defined by its angular relationship to said radial direction.

14. The brush seal of claim 13 wherein the bristles of said at least one upstream bristle layer are shorter than those bristles in downstream bristle layers.

15. The brush seal of claim 14 wherein said means comprises an inlet flow guide attached to said upstream plate, said guide including a guide plate and a flange extending upstream from said guide plate.

16. A method for reducing chamfering of the upstream bristles of a brush seal, said brush seal sealing a leakage path between a rotating and stationary members of a fluid flow machine, said brush seal having at least one stage, said stage including a bristle pack and an upstream and a downstream plate sandwiching said bristle pack, said bristle pack defined in part by an axial width defining an axial direction, said axial direction being substantially parallel to the direction of the leakage path, said bristle pack having upstream and downstream sides and further including a plurality of bristles disposed in multiple layers in said axial direction, each of said bristles being attached at one end and free at the other end and each said bristle being defined by a longitudinal length and a cross sectional area taken substantially transversely to said longitudinal length, each of said bristles being disposed at a bristle lay angle, said angle being defined relative to a radius drawn transverse to said axis of rotation through the attached end of each said bristle, said method comprising:

placing said bristles in at least one upstream layer at a lesser lay angle than the said bristles in downstream layers, wherein the rotation of said rotating member defines a radial direction relative thereto, wherein each bristle of said bristle pack has a longitudinal axis defined by its longitudinal length, and wherein the lay angle of a bristle in a bristle layer is defined by its angular relationship to said radial direction.

* * * * *